(12) United States Patent
Yasuoka et al.

(10) Patent No.: US 7,965,625 B2
(45) Date of Patent: Jun. 21, 2011

(54) COMMUNICATION DEVICE AND LOGICAL LINK ABNORMALITY DETECTION METHOD

(75) Inventors: Hirotomo Yasuoka, Yokohama (JP); Jun Itoh, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 954 days.

(21) Appl. No.: 11/171,629

(22) Filed: Jun. 30, 2005

(65) Prior Publication Data
US 2006/0221840 A1 Oct. 5, 2006

(30) Foreign Application Priority Data
Mar. 29, 2005 (JP) ................................. 2005-094929

(51) Int. Cl.
*G01R 31/08* (2006.01)
(52) U.S. Cl. ..................... 370/218; 370/242; 370/536
(58) Field of Classification Search .............. 370/242, 370/218–228, 536
See application file for complete search history.

(56) References Cited

U.S. PATENT DOCUMENTS

| | | | | |
|---|---|---|---|---|
| 4,627,045 | A * | 12/1986 | Olson et al. ................. | 370/225 |
| 6,694,471 | B1 * | 2/2004 | Sharp ........................... | 714/749 |
| 6,778,495 | B1 | 8/2004 | Blair | |
| 6,879,589 | B2 | 4/2005 | Sera | |
| 2001/0005371 | A1 | 6/2001 | Sera | |
| 2003/0235151 | A1 | 12/2003 | McClellan | |
| 2005/0022045 | A1 * | 1/2005 | Fenart et al. ................. | 714/4 |
| 2005/0047391 | A1 | 3/2005 | Tuxen | |
| 2005/0088966 | A9 * | 4/2005 | Stewart ....................... | 370/218 |
| 2006/0193295 | A1 * | 8/2006 | White et al. .................. | 370/336 |
| 2006/0198325 | A1 * | 9/2006 | Gao et al. ..................... | 370/270 |
| 2008/0002669 | A1 * | 1/2008 | O'Brien et al. ............... | 370/352 |

FOREIGN PATENT DOCUMENTS

| | | |
|---|---|---|
| JP | 05260060 | 10/1993 |
| JP | 6-014056 | 1/1994 |
| JP | 6-053982 | 2/1994 |
| JP | 2001-186171 | 7/2001 |
| WO | WO 03/094477 | 11/2003 |

OTHER PUBLICATIONS

European Search Report dated May 29, 2006.
Notification of Reason(s) for Rejection dated Mar. 18, 2008, for corresponding Japanese Patent Application JP 2005-094929.
A. Abd El Al, et al., "Load sharing in stream control transmission protocol", May 2003, pp. 2-27, Internet Engineering Task Force, http://tools.ietf.org/draft/draft-ahmed-Issctp/draft-ahmed-Issctp-00.txt.

* cited by examiner

*Primary Examiner* — Kevin C Harper
*Assistant Examiner* — Sai-Ming Chan
(74) *Attorney, Agent, or Firm* — Fujitsu Patent Center

(57) ABSTRACT

The present invention provides a communication device capable of providing a highly reliable service by detecting communication abnormality at a high speed. The communication device comprises a link configuring unit configuring a plurality of logical links between a opposite communication device, a segmenting unit segmenting transmission data as being associated with each of the plurality of logical links, a transmission unit transmitting the segmented data via the logical link associated with this segmented data, a receiving unit receiving the data via each of the plurality of logical links, and an abnormality detection unit judging, within a predetermined period of time since the data were received via any one of the plurality of logical links, if the data are not received via at least one of the remaining logical links, at least one logical link to be an abnormal logical link.

5 Claims, 20 Drawing Sheets

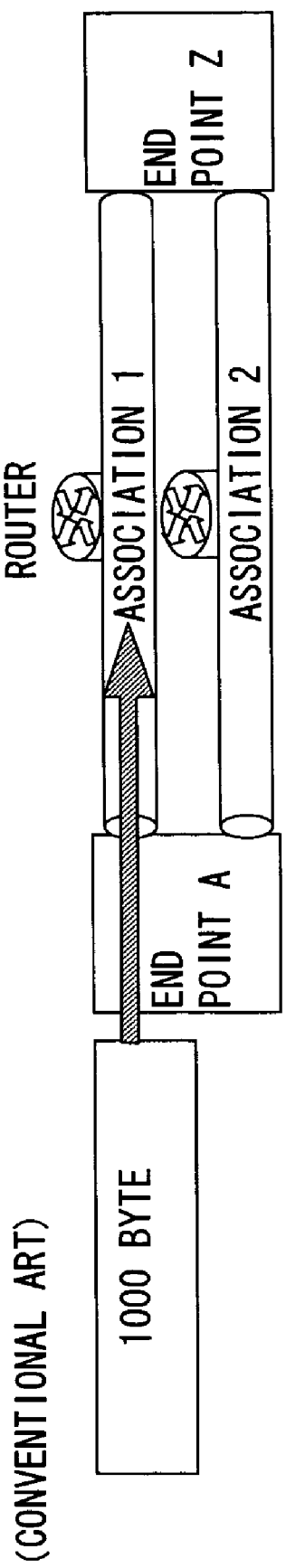

FIG. 1B (AN EMBODIMENT OF THE PRESENT INVENTION)

FIG. 5

| CHUNK TYPE | DATA KIND | ABBREVIATED NAME |
|---|---|---|
| 0 | Payload Data | DATA |
| 1 | Initiation | INIT |
| 2 | Initiation Acknowledgement | INIT ACK |
| 3 | Selective Acknowledgement | SACK |
| 4 | Heartbeat Request | HEARTBEAT |
| 5 | Heartbeat Acknowledgement | HEARTBEAT ACK |
| 6 | Abort | ABORT |
| 7 | Shutdown | SHUTDOWN |
| 8 | Shutdown Acknowledgement | SHUTDOWN ACK |
| 9 | Operation Error | ERROR |
| 10 | State Cookie | COOKIE ECHO |
| 11 | Cookie Acknowledgement | COOKIE ACK |
| 12 | Reserved for Explicit Congestion Notification Echo | ECNE |
| 13 | Reserved for Congestion Window Reduced | CWR |
| 14 | Shutdown Complete | SHUTDOWN COMPLETE |
| 15~62 | Reserved | — |
| 63 | Reserved for Extension | — |
| 64~126 | Reserved | — |
| 127 | Reserved for Extension | — |
| 128~190 | Reserved | — |
| 191 | Reserved for Extension | — |
| 192 | Forward TSN | FORWARD TSN |
| 193~254 | Reserved | — |
| 255 | Reserved for Extension | — |

FIG. 6

| MSB 2-BIT OF CHUNK TYPE | MEANINGS |
|---|---|
| 00 | TO STOP SCTP PACKET PROCESS, DISCARD PACKET AND EXECUTE NO FURTHER CHUNK PROCESS. |
| 01 | TO STOP SCTP PACKET PROCESS, DISCARD PACKET AND MAKE ERROR RESPONSE OF [UNAPPROVED CHUNK TYPE] (ANY OF CHUNK TYPE IS ERROR OR INIT ACK) BY EXECUTING NO FURTHER CHUNK PROCESS. |
| 10 | TO SKIP CHUNK PROCESS AND PROCESS NEXT CHUNK. |
| 11 | TO SKIP CHUNK PROCESS AND PROCESS NEXT CHUNK BUT MAKE RESPONSE OF CHUNK OF ERROR AS [UNAPPROVED CHUNK TYPE] FOR CAUSE. |

FIG. 8

END POINT-END POINT

| ASSOCIATION INFORMATION | ASSOCIATION STATE | NUMBER | TOTAL NUMBER OF ASSOCIATIONS |
|---|---|---|---|
| — | — | — | — |
| — | — | — |  |

FIG. 10

END POINT-END POINT

| ASSOCIATION INFORMATION | ASSOCIATION STATE | NUMBER | TOTAL NUMBER OF ASSOCIATIONS |
|---|---|---|---|
| ASSOCIATION1 | NORMAL | 0 | 2 |
| ASSOCIATION2 | NORMAL | 1 | |

FIG. 13

END POINT-END POINT

| ASSOCIATION INFORMATION | ASSOCIATION STATE | NUMBER | TOTAL NUMBER OF ASSOCIATIONS |
|---|---|---|---|
| ASSOCIATION1 | ABNORMAL | 0 | 2 |
| ASSOCIATION2 | NORMAL | 1 | |

FIG. 15

| TIMER NAME | OUTLINE/ PURPOSE FOR USE | TIMER INITIAL VALUE (RECOMMENDED VALUE) | TIMER MAXIMUM VALUE (RECOMMENDED VALUE) | TIMER MINIMUM VALUE (RECOMMENDED VALUE) | RETRY COUNT (RECOMMENDED VALUE) |
|---|---|---|---|---|---|
| T3-RTX TIMER | USED FOR ASSURING DATA TRANSMISSION | 3 SEC | 60 SEC | 1 SEC | 10 TIMES |

COMMUNICATION DEVICE AND LOGICAL LINK ABNORMALITY DETECTION METHOD

BACKGROUND OF THE INVENTION

1. Field of the Invention

The present invention relates to a communication device that transmits and receives data by use of a logical link.

2. Description of the Related Art

SCTP (Stream Control Transmission Protocol) is a transmission protocol for transporting a signaling message utilized in a public switched telephone network (which will hereinafter be abbreviated to PSTN) over an IP (Internet Protocol) network, and is defined in RFC2960 of IETF (Internet Engineering Task Force).

Further, SCTP is a transport layer protocol that supports multi-homing and enables highly reliable data transmission over the IP layer, and is designed so as to be capable of dealing with DOS attacks (Denial of Service Attacks) etc. occurred when setting an association. SCTP is capable of securely transmitting the signals from PSTN even over the IP network having low reliability. The following are basic features of SCTP. Note that terminals (e.g., a server and a client or the like) performing SCTP-based communications are referred to as endpoints in the following discussion.

(1) SCTP is a unicast protocol. Further, SCTP supports the multi-homing and is therefore capable of data switching between the endpoints each having a plurality of IP addresses.

(2) SCTP transmits the data in a way that eliminates damaged data etc. and enables the highly reliable transmission by retransmitting these pieces of fault data as the necessity arises.

(3) SCTP handles full-duplex transmission.

(4) SCTP is message-oriented and supports framing at a message boundary. On the other hand, TCP (Transmission Control Protocol) is byte-oriented and is not protected with respect to an implicit structure within a byte stream to be transmitted.

(5) SCTP has the similar congestion control algorithm as TCP has.

FIG. 16 shows an example of a protocol stack that supports SCTP. As shown in FIG. 16, SCTP employs IP as a network protocol. Then, SCTP is utilized as a transport protocol by M3UA (MTP3 User Adaptation) etc. defined as an adaptation module for adapting the PSTN protocol to the IP network.

As described above, SCTP has the multi-homing function. FIG. 17 shows an image of the multi-homing and SCTP associations. In SCTP, a logical connection between the endpoints is termed an Association. Approximately, four billion and three hundred million ($2^{32}-1$) associations can be set between the endpoints, wherein every association is identified by use of tags (TAG).

According to the multi-homing supported by SCTP, the endpoint is assigned a plurality of IP addresses, whereby a communication path between the endpoints can be multiplexed. In the example in FIG. 17, a single association is established between an endpoint A and an endpoint Z. Then, the endpoint A is assigned three pieces of IP addresses (which are IP addresses A, B and C shown in FIG. 17), and the endpoint Z is assigned two pieces of IP addresses (which are IP addresses X and Y shown in FIG. 17), thereby multiplexing the path in the association. With this multiplexing, according to SCTP, even if a primary path becomes unavailable for communications, the communications can continue through other preset communication paths. It is therefore possible to enhance the reliability of the data transmission.

The following is an explanation of an SCTP abnormality detecting operation if abnormality occurs in the association. To begin with, the abnormality detecting operation in a case where the abnormality occurs in the association that does not use the multi-homing, will be described with reference to FIGS. 18 and 19. FIG. 18 is a diagram showing how the multi-homing-unused SCTP association is established. In this example, two lines of multi-homing-unused associations (associations 1 and 2 shown in FIG. 18) are established between the endpoint A and the endpoint Z. Routers (routers 221 and 222 shown in FIG. 18) can be interposed in the paths within the respective associations.

FIG. 19 shows how the communication abnormality occurs in the association 1 in a connecting environment shown in FIG. 17. If the abnormality occurs in the association 1 when a message is transmitted to the endpoint Z from the endpoint A, the endpoint A detects that the transmitted message does not yet reach. From this detection, the abnormality in the association 1 is detected. The endpoint A detects unreachableness of the message when an SCTP-based retransmission timer expires.

Next, a case in which the abnormality occurs in the association that uses the multi-homing, will be explained with reference to FIGS. 20 and 21. FIG. 20 illustrates how the SCTP association using the multi-homing is established. In this example, two lines of SCTP associations (the associations 1 and 2 shown in FIG. 20) each using the multi-homing are established between the endpoint A and the endpoint Z. Further, each of the associations 1 and 2 uses the multi-homing, wherein two paths are extended within each of the associations (the association 1 contains the paths A and B, and the association 2 contains the paths C and D). Note that when the plurality of paths are extended within the association, one of those paths is determined as a primary path (the primary paths shown in FIG. 20 are the paths A and C).

FIG. 21 shows how the abnormality occurs in the path A within the association 1 in the connecting environment shown in FIG. 20. If the abnormality occurs in the path A of the association 1 when the message is transmitted to the endpoint Z from the endpoint A, the endpoint A detects that the transmitted message does not yet reach. From this detection, the abnormality in the path A of the association 1 is detected. The endpoint A detects the unreachableness of the message when the SCTP retransmission timer expires.

Namely, if the abnormality occurs within the association, the unreachableness of the message is detected after the endpoint on the transmitting side has effected the retransmission a specified number of times irrespective of whether the multi-homing is used or unused, thereby detecting the communication abnormality in the association. FIG. 22 is a diagram showing an operating sequence of each endpoint when the communication abnormality occurs.

In the case that the data are sent from the endpoint A via a router to the endpoint Z, when the data normally reach the endpoint Z, an S-ACK chunk is sent back from the endpoint Z. The "chunk" is a format unit of a SCTP message stream. If the communication abnormality occurs, however, the S-ACK chunk is not sent back from the endpoint Z, therefore, the endpoint A is unable to acquire acknowledgement that the transmission data reach. Such being the case, the endpoint A retransmits the transmission data a specified number of times. During the retransmission of the transmission data, the endpoint A monitors a specified retransmission timer (T3-rtx timer shown in FIG. 22), and detects the abnormality in the path employed for transmitting the data from the expiration of the retransmission timer. The endpoint A, which has detected the abnormality, notifies the endpoint Z of this communication abnormality by using other association or path.

Note that documents of the conventional art related to the present invention of the application are those disclosed as follows. The conventional art documents are "TOKUKAI 2001-186171", "TOKUKAIHEI 06-14056", "TOKU-KAIHEI 06-53982", and "R. Stewart, Q. Xie, et al., "Stream Control Transmission Protocol", Request for Comments: 2960".

In the abnormality detection method according to this conventional art, however, it takes a long period of time till the endpoint detects a fault in the association or a fault in the path within the association. This is because the abnormality is not detected till a retransmission process (which involves the retransmission and the expiration of the retransmission timer in the endpoint A shown in FIG. 22) specified in the endpoint is completed. This being the case, a real-time application using SCTP in the conventional art expends much time for abnormality detection control in the case where the communication abnormality occurs, and there is a possibility that a service can not be provided exactly. Further, a great number of retrying operations based on the application are brought about at an abnormal time, resulting in a possibility of causing a decrease in traffic efficiency of the network as a whole.

SUMMARY OF THE INVENTION

The object of the present invention is to provide a communication device capable of providing a highly reliable service by detecting communication abnormality at a high speed.

The present invention adopts the following configurations in order to solve the problems described above. Namely, the present invention is a communication device comprising a link configuring unit configuring a plurality of logical links between the communication device itself and a opposite communication device, a segmenting unit segmenting transmission data in a way that associates the segmented data to each of the plurality of logical links, and a transmission unit transmitting the segmented data via one logical link associated with this segmented data.

Further, the present invention is a communication device comprising a link configuring unit configuring a plurality of logical links between the communication device itself and a opposite communication device, a segmenting unit segmenting transmission data in a way that associates the segmented data to each of the plurality of logical links, a transmission unit transmitting the segmented data via the logical link associated with this segmented data, a receiving unit receiving the data via each of the plurality of logical links, and an abnormality detection unit judging, within a predetermined period of time since the data were received via any one of the plurality of logical links, if the data are not received via at least one of the remaining logical links, at least one logical link to be an abnormal logical link.

In the present invention, when the communication device according to the present invention transmits the data, the data are segmented corresponding to the logical links established between the communication device itself and the communication device serving as the transmission destination, wherein the data are transmitted simultaneously via the respective logical links. On the other hand, in the receiving-side communication device, if the logical links established between the self-device and the communication device as a transmission source contain even one logical link via which the data are not received, this link is judged to be an abnormal logical link.

Thus, according to the present invention, in the receiving-side communication device, if there exists even one logical link via which the data are not received, it is judged that there is the abnormal logical link. Namely, the judgment about the abnormal logical link involves judging whether the data are received via all the logical links or not.

Hence, according to the present invention, it is possible to promptly detect the abnormality in the logical link by the receiving-side communication device without waiting for the transmitting-side communication device to detect the transmission abnormality.

Moreover, the communication device according to the present invention, when segmenting the data, assigns a transmission number to every segmented data, and transmits the segmented data together with the transmission number assigned to every segmented data. Further, the communication device according to the present invention synthesizes the data received via every logical link, corresponding to the transmission number received together with this data.

In the present invention, the transmitting-side communication device assigns the transmission number to every segmented data, and transmits the segmented data together with the transmission number. The receiving-side communication device synthesizes the received data in sequence of the transmission number, whereby the received data can be restored into the original data.

Moreover, a communication device according to the present invention further comprises a storage unit storing information about the logical link judged to be the abnormal logical link, wherein if the storage unit contains information about the abnormal logical link when requested to transmit the data, un-segmented data are transmitted via the logical link other than the abnormal logical link.

Therefore, according to the present invention, if the abnormality occurs in the logical link and even when requested to transmit the data during the reestablishment of the logical link, the data can be normally transmitted.

Note that the present invention may be a program for actualizing any one of the functions given above. Further, the present invention may also be a readable-by-computer storage medium stored with such a program.

According to the present invention, it is feasible to actualize the communication device capable of providing the highly reliable service by detecting the communication abnormality at the high speed.

BRIEF DESCRIPTION OF THE DRAWINGS

FIGS. 1A and 1B are diagrams showing an outline of functions of a communication device in an embodiment of the present invention;

FIG. 5 is a diagram showing a data type for every chunk type;

FIG. 6 is a diagram showing receiving-side device's processes corresponding to the chunk types;

FIG. 8 is a diagram showing an association information table;

FIG. 10 is a diagram showing an example of settings in an association information table;

FIG. 13 is a diagram showing an example of the settings in the association information table (when the abnormality occurs);

FIG. 15 is a diagram showing recommended values of an SCTP timer;

DESCRIPTION OF THE PREFERRED EMBODIMENTS

Figure 2:
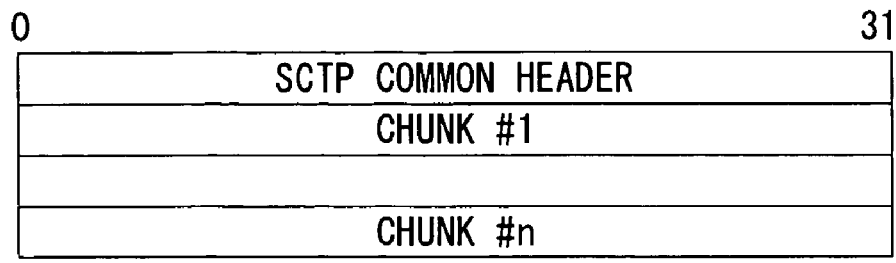
FIG. 2 is a diagram showing an SCTP message format.

A communication device according to a best mode (which will hereinafter be referred to as an embodiment) for carrying out the present invention, will hereinafter be explained with reference to the drawings. A configuration of the embodiment is an exemplification, and the present invention is not limited to the configuration of the embodiment. The embodiment, which will hereinafter be discussed, will exemplify an SCTP (Stream Control Transmission Protocol) communication device, however, the present invention is not limited to SCTP communications and relates to a communication device aiming at all of protocols enabling logical connections to be established.

[Outline of Functions in Embodiment]

Figure 1B:
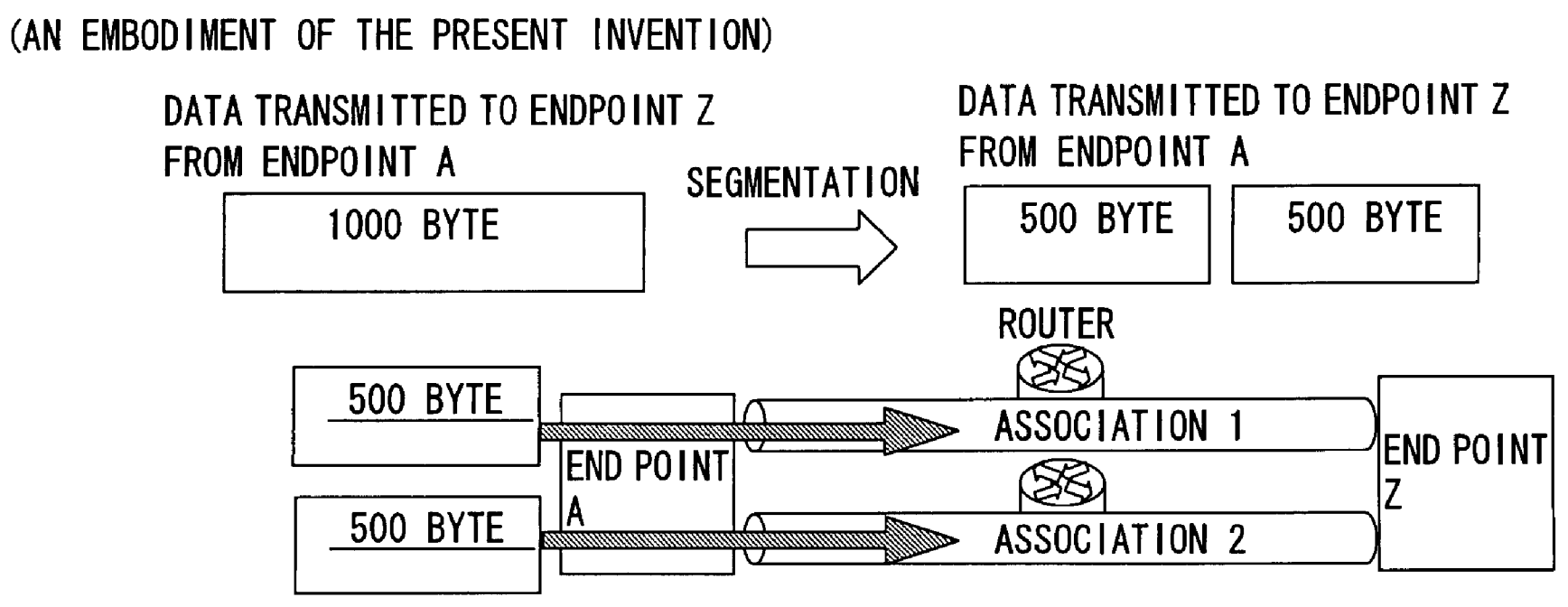

To discuss the embodiment of the present invention, at first, an outline of functions of a communication device in the embodiment of the present invention will be explained. FIGS. 1A and 1B are explanatory diagrams of the outline of the functions of the communication device in the embodiment. FIG. 1A shows SCTP communications in a conventional communication device, and FIG. 1B shows the SCTP communications in the communication device according to the embodiment. In the examples shown in FIGS. 1A and 1B, two lines of associations are established between an endpoint A and an endpoint Z each serving as an SCTP communication device.

In the conventional SCTP communication device, as shown in FIG. 1A, when transmitting 1000-byte data to the endpoint Z from the endpoint A, one (association 1) of the associations established therebetween is employed, whereby the 1000-byte data are thus transmitted. Then, if the abnormality occurs in the association 1 used for the communications, the endpoint A on the transmitting side detects the abnormality by the SCTP retransmission process. Thereafter, the endpoint A retransmits the data, which could not be transmitted last time, by use of the other association 2 where the abnormality does not occur.

In the communication device according to the embodiment of the present invention, when transmitting the data to the endpoint Z from the endpoint A, the transmission data are segmented corresponding to the number of the associations established therebetween and thus transmitted via the respective associations. To be specific, as shown in FIG. 1B, when there are the 1000-byte transmission data, the 1000-byte data are segmented by 500 bytes, wherein the 500-byte data are transmitted via the association 1 and another 500-byte data are transmitted via the association 2, simultaneously.

The receiving-side communication device (endpoint Z) according to the embodiment, when receiving the data via the associations 1 and 2, restores the data by reassembling these sets of data received. In this restoration process, if unable to normally complete the restoration process because of receiving none of the predetermined data, the communication device on the receiving side detects the communication abnormality in the association.

Thus, a contrivance is that the communication device in the embodiment, as the data receiving-side device detects the abnormality in the association when the abnormality occurs in the association, reduces abnormality detection time.

This is the same with the association using the multi-homing. In the case of employing the multi-homing, even if the abnormality occurs in one of the paths, other path is automatically selected, and hence the association gets into the abnormality when the abnormalities occur in all the paths within the same association.

[SCTP Message Format]

Herein, an SCTP message format defined in RFC (Request For Comments)2960 will be explained with reference to FIGS. 2 through 6. FIG. 2 is a diagram showing the SCTP message format. An SCTP packet consists of, as shown in FIG. 2, one SCTP common header and a plurality of chunks (chunk #n). The chunks contained in the SCTP packet are multiplexed down to a size of Path-MTU (Maximum Transmission Unit).

Figure 3:
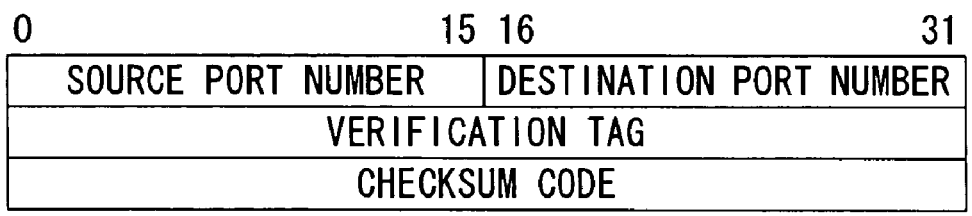
FIG. 3 is a diagram showing a format of an SCTP common header.

FIG. 3 shows a format of the SCTP common header of the SCTP message. The SCTP common header contains the following information.

Source port number (16 bits): the transmitting side port number of the SCTP packet Destination port number (16 bits): the destination port number of the SCTP packet Verification Tag (32 bits) (which will hereinafter simply termed Tag): Tag is a 32-bit length value generated at random and is an ID serving as a key for identifying the association. If the plurality of associations are established between the communication devices, each association is identified by this ID. In the embodiment, the ID is managed as an association number.

Checksum Code (32 bits): Checksum code is what checksum calculation based on CRC-32c algorithm is made.

Figure 4:
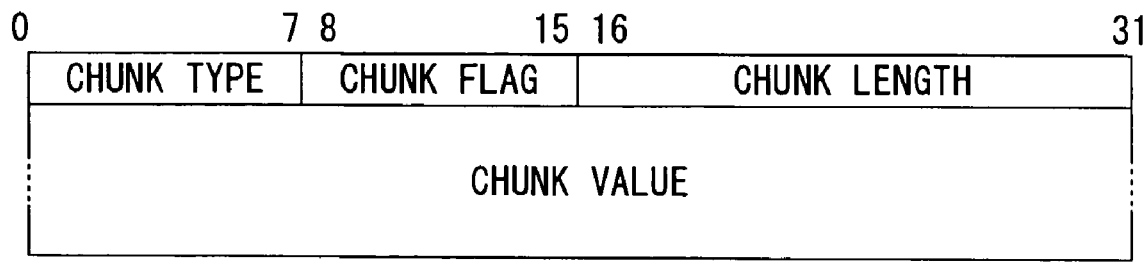
FIG. 4 is a diagram showing a message format of a chunk.

FIG. 4 shows a message format of the chunk that is contained in the SCTP packet. The chunk contains a chunk type, a chunk flag, a chunk length and a chunk value. The chunk contains control information or user data, corresponding to a data type set in the chunk type. Then, actual pieces of information, which should be transferred in the chunks, are set as chunk values. FIG. 5 shows a relative table between the chunk type and the data type.

Further, the chunk type also indicates a chunk processing method in the receiving-side communication device receiving the chunk. FIG. 6 is a relative table between the data in the chunk type and a process corresponding to this data in the receiving-side communication device. The endpoint, when receiving the chunk including the chunk type unknown to the endpoint itself, judges from the most significant 2-bits of the chunk type whether the chunk must be processed or not.

[Configuration of Device]

Figure 7:
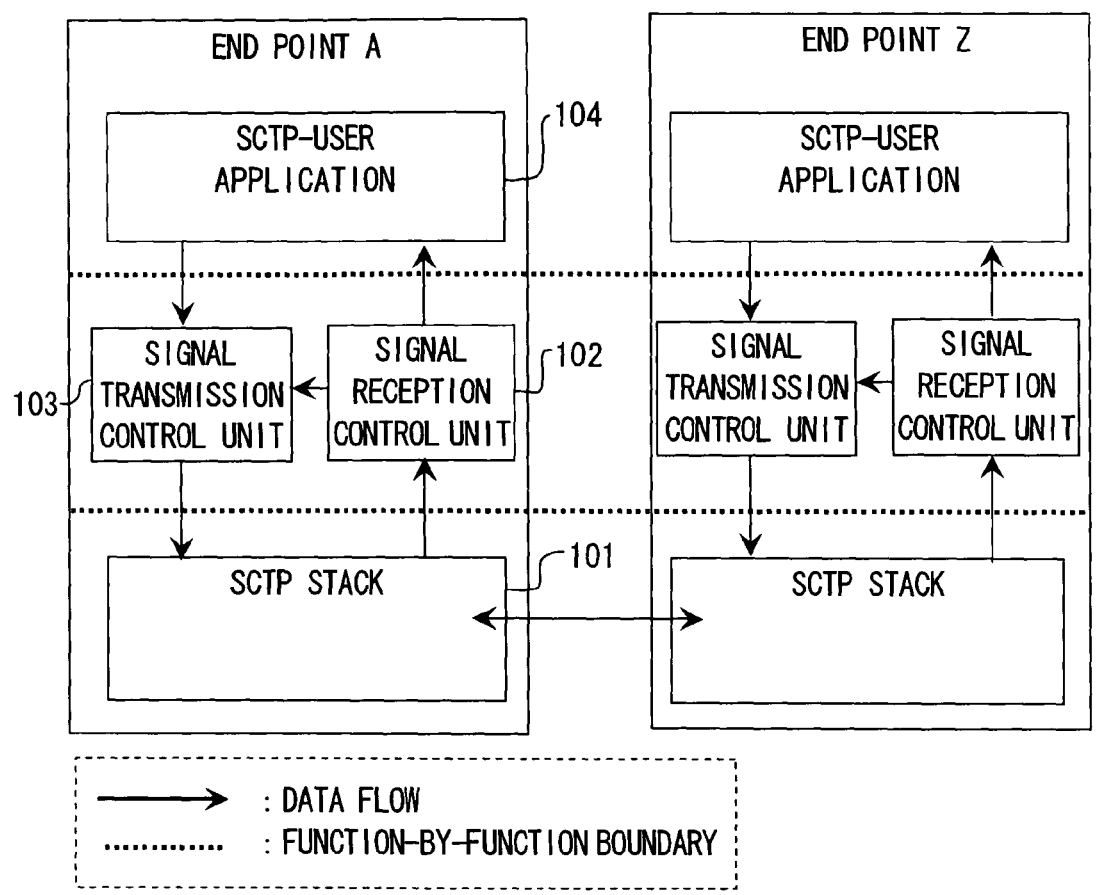
FIG. 7 is a diagram showing a functional configuration of the communication device in the embodiment.

Next, a functional configuration of the communication device according to the embodiment will hereinafter be described with reference to FIG. 7. FIG. 7 shows that the two communication devices (the endpoints A and Z) according to the embodiment (which will hereinafter be called the communication devices or the endpoints A and Z) are connected in a communicable state. The communication device is constructed of a CPU (Central Processing Unit), a memory, an I/O interface, etc., and the CPU executes programs stored on the memory, thereby actualizing respective functions shown in FIG. 7. The communication device may be, for instance, a personal computer and may also be a gateway device or a router that connects a PSTN (Public Switched Telephone Network) to an IP (Internet Protocol) network, i.e., the communication device having the functional configuration shown in FIG. 7 suffices. Further, a connecting form (topology) between the respective communication devices according to the embodiment is not particularly limited and may be a connecting form suited to a protocol stack enabling actualization of the SCTP communications. For example, in the case of utilizing Ethernet (registered trademark) as a data link layer, the connecting form may be such that the communication devices are connected over the physical layer such as 10BASE-T/2/5, 100BASE-T, etc. Furthermore, communication devices may be wirelessly connected without being limited to the wired physical layer.

The communication device according to the embodiment is constructed of an SCTP stack 101 (corresponding to a link configuring unit and a receiving unit according to the present invention), a signal reception control unit 102 (corresponding to an abnormality detection unit and a synthesizing unit according to the present invention), a signal transmission control unit 103 (corresponding to a segmenting unit and a transmitting unit according to the present invention), an SCTP-USER application 104 and an association information table (corresponding to a storage unit according to the present invention). The communication device according to the embodiment actualizes the functions of the present invention by providing the signal reception control unit 102 and the signal transmission control unit 103 between the SCTP stack 101 and the SCTP-USER application 104 without altering SCTP itself defined in RFC2960 etc. The functional units will be individually described as follows.

<SCTP Stack>

The SCTP stack 101 is a protocol stack that supports SCTP defined in RFC2960 etc. Namely, the SCTP stack 101 supports SCTP as a transport layer and supports IP as a network layer. In the SCTP stack 101, there is no limit with respect to protocols of the lower-order layers (the data link layer and the physical layer) than the network layer as described above.

<SCTP-USER Application>

The SCTP-USER application 104 is an application for actualizing the variety of functions through the SCTP communications. For example, the SCTP-USER application 104, when the communication device is the gateway device that connects the PSTN to the IP network, may also be M3UA (MTP3 User Adaptation) etc. as an adaptation module for adapting the PSTN protocol to the IP network.

<Association Information Table>

The association information table is, though not illustrated in FIG. 7, a table, stored on the memory, to which the signal transmission control unit 103 and the signal reception control unit 102 refer. FIG. 8 shows the association information table of the associations between the endpoint A and the endpoint Z. The association information table is retained by both of the transmitting-side communication device and the receiving-side communication device. The association information table is, as shown in FIG. 8, stored with pieces of information about an association number and an association communication state on an association-by-association-basis. A Tag value in the SCTP common header is set in the association number. Further, a total number of associations established in the communication devices is retained therein.

When establishing the association, a record about this association is created in the association information table. The signal reception control unit 102 and the signal transmission control unit 103 are notified of Tag information about the association established by the SCTP stack 101, and the association information table is generated based on the notified information. Note that the embodiment exemplifies only the association information table of the associations between the endpoint A and the endpoint Z, however, the association information about the associations between other endpoints are similarly retained. In this case, the table may be prepared for every communication partner endpoint, and the association information may also be managed by one table in a way that prepares a field for storing a port number etc. for identifying the partner endpoint.

<Signal Transmission Control Unit>

The signal transmission control unit 103 segments the data transmitted from the SCTP-USER application 104 on the association-by-association basis, and instructs the SCTP stack 101 to simultaneously transmit the segmented data by use of the respective associations. The information on the association is extracted from the association information table.

The data segmentation by the signal transmission control unit 103 does not particularly limit the segmentation method. The conceivable segmentation methods are, for instance, an equal segmentation for segmenting the data in a transmission data size that is equal throughout all the associations, a variable segmentation that determines the transmission data size depending on a transmission speed of each association, and so on. The example shown in FIG. 1B adopts the segmentation method that the 1000-byte transmission data are segmented equally by the total number (2) of associations (1000÷2=500), wherein the first 500-byte data are transmitted via the association 1, and the next 500-byte data are transmitted via the association 2, simultaneously. Note that a method of similarly transmitting the transmission data via all the associations without segmenting the data can be considered, however, the segmentation method is adopted in order to restrain a data processing load on the partner communication device by reducing the data size for the transmission via one association. An assumption in the embodiment is that the equal segmentation method be adopted.

Further, the signal transmission control unit 103 retains the pre-segmentation data till a normal S-ACK chunk is sent back from the partner communication device. This scheme is that if the abnormality occurs in a certain association, the data are transmitted via other normal associations without the segmentation thereof. Similarly, the signal transmission control unit 103, which has received a data transmission request afresh, refers to the association information table and, if there is even one single association exhibiting an abnormal communication state, transmits the data in the non-segmented state by use of the normal associations.

<Signal Reception Control Unit>

The signal reception control unit 102 restores the data sent from the partner communication device and transfers the restored data to the SCTP-USER application 104. The signal reception control unit 102 detects, as a restoration failure in the data restoration becomes a trigger, the communication abnormality in the association (which will hereinafter be termed association abnormality). The signal reception control unit 102, if the data are not received via all the associations in the case of receiving the data any one of the established associations, conceives this as the restoration failure.

[Example of Operation]

Next, an example of the operation of the communication device in the embodiment will be explained with reference to FIGS. 9 through 12.

<Operation at Normal Time>

Figure 9:
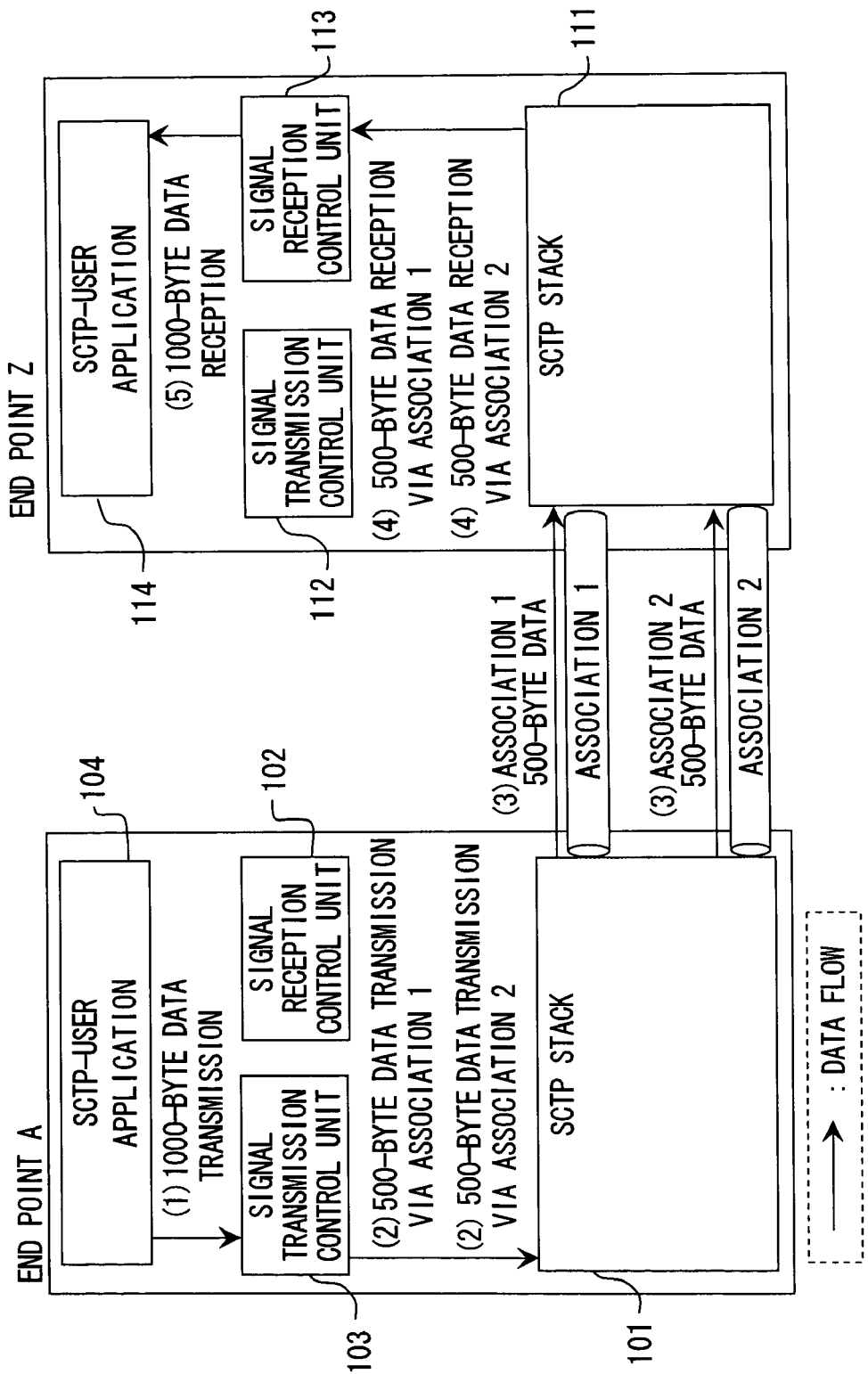
FIG. 9 is a diagram showing an image of data transmission between the communication devices in the embodiment.

To start with, the operation of the communication device at the normal time (when the association abnormality does not occur) will be explained with reference to FIGS. 9 and 10. FIG. 9 is a diagram illustrating an image of the data transmission between the communication devices. FIG. 10 shows an example of settings in the association information table in the embodiment.

FIG. 9 illustrates the two communication devices (the endpoints A and B) in the embodiment shown in FIG. 7. The two associations (the associations 1 and 2) are established between the endpoint A and the endpoint B. In the case of transmitting the 1000-byte data to the endpoint Z from the endpoint A under this condition, the operation of the communication device will be described as below.

The signal transmission control unit 103, when requesting a 1000-byte data transmission from the SCTP-USER application 104 ((1) shown in FIG. 9), refers to the association information table. In this case, the association information table has the settings as shown in FIG. 10 and is retained by both of the endpoints A and Z. Namely, records about the two associations are set in the association information table, wherein the communication information of the respective associations is set as being normal.

The signal transmission control unit 103 knows from the association information table that two lines of relevant associations exist. The signal transmission control unit 103 equally segments the should-transmit-data by the total number of associations on the basis of the communication information (1000 bytes/2=500 bytes). Then, the signal transmission control unit 103 determines a transmission number of the segmented data in sequence from the head. Herein, the signal transmission control unit 103 determines a transmission number "1" to be assigned to the data counted 500 bytes from the head of the transmission data and a transmission number "2" to be assigned to the data counted up to 1000 bytes from 501 bytes.

The signal transmission control unit 103 transfers the segmented data together with the association numbers and the transmission numbers, which are each employed for the transmission, to the SCTP stack 101 ((2) shown in FIG. 9). Based on these data and information, the SCTP stack 101 generates an SCTP packet. SCTP message formats generated at this time are the formats shown in FIGS. 2 through 4. The segmented data itself is set as a chunk value (which is the chunk value shown in FIG. 4), and the transmission number assigned to every segmented data as a chunk flag (which is the chunk flag shown in FIG. 4) is set. The SCTP stack 101 transmits the 500-byte data assigned the transmission number "1" via the association 1 and another 500-byte data assigned the transmission number "2" via the association 2, simultaneously ((3) shown in FIG. 9).

The receiving-side endpoint Z receives the SCTP packet containing the segmented data via the associations 1 and 2. An SCTP stack 111 extracts the segmented data, the transmission numbers and Tag from the received SCTP packet. The SCTP stack 11 transfers these extracted data to the signal reception control unit 113 ((4) shown in FIG. 9). The signal reception control unit 113 searches through the self-retained association information table by use of the Tag value as a key, and thus confirms that the data are received via all the relevant associations. Thereafter, the signal reception control unit 113 reassembles the segmented data in sequence of the transmission numbers, thereby restoring the transmission data ((5) shown in FIG. 9).

<<Operation Flow at Normal Time>>

Figure 11:
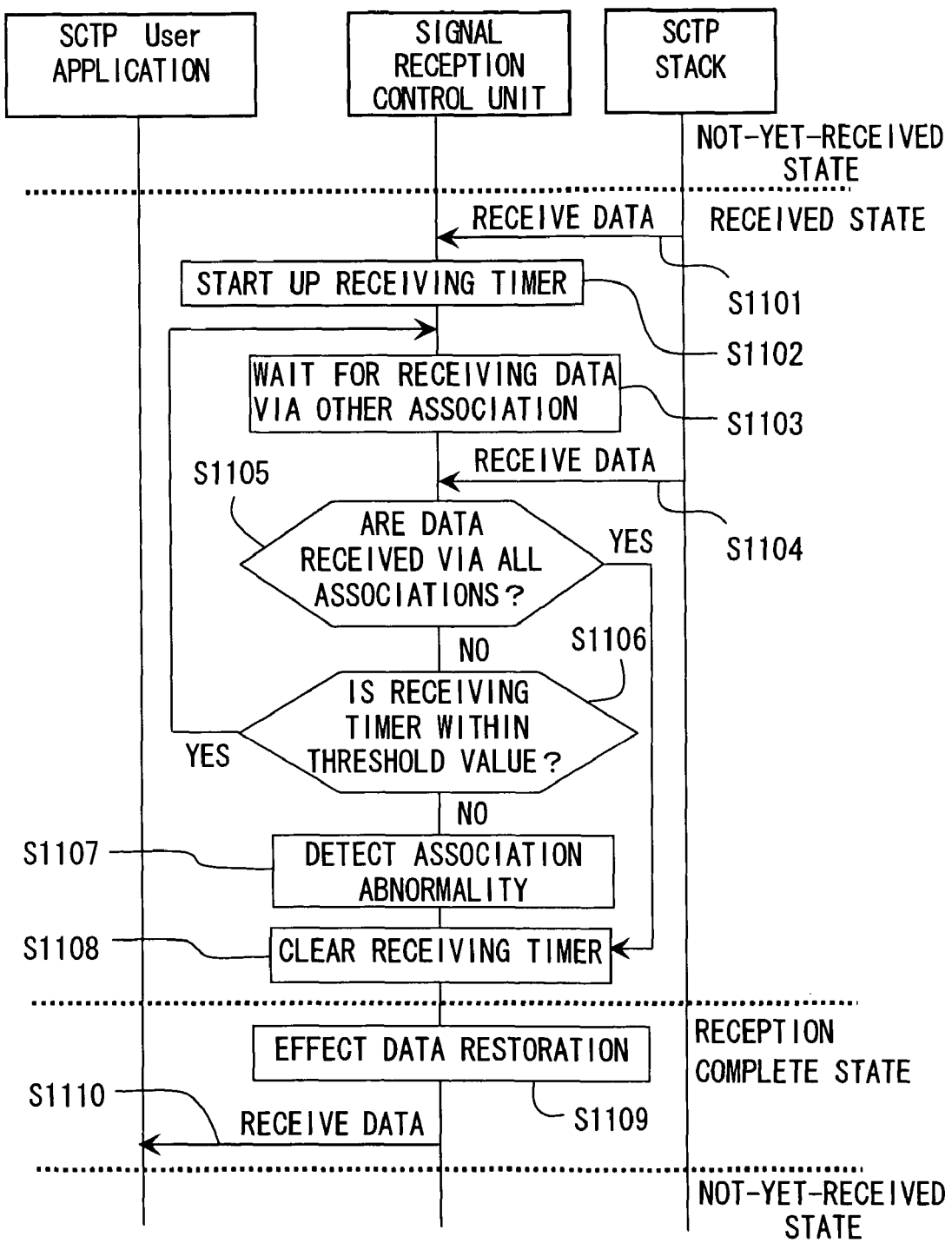
FIG. 11 is a diagram showing an operation sequence of the communication device according to the embodiment at a normal time.

An operation flow of the communication device at the normal time will be explained with reference to FIG. 11. FIG. 11 shows an operation sequence of the communication device at the normal time in the embodiment.

The communication device stays in the [not-yet-received state] when the communication device is in a data not-yet-received state and all the associations are normal. Thereafter, when the data are received via any one of the associations, the communication device transits to a [received state]. The received data are transferred to the signal reception control unit from the SCTP stack (S1101). Upon the transition to the [received state], the signal reception control unit starts up a receiving timer (S1102). This receiving timer is a waiting timer of waiting time till the data are received from all the associations.

Thereafter, the signal reception control unit waits for the data to be received from the association other than the association through which the previous data have been received (S1103). In the case of receiving the data via other association (S1104), the signal reception control unit judges whether the data are received via all the associations or not (S1105). If the data are received via all the associations (S1105; YES), the signal reception control unit clears the receiving timer (S1108), and there comes a [reception complete state]. When transiting to the [reception complete state], the signal reception control unit restores the received data (S1109), and transfers the restored data to the SCTP-USER application (S1110).

Whereas if the data are not received via all the associations (S1105; NO) and if the receiving timer exceeds a threshold value (S1106; NO), the signal reception control unit conceives that the abnormality occurs in the association via which the data are not received (S1107). Thus, if the association abnormality is detected, the communication device transits to an [abnormal association detected state]. An operation from this state onward will be discussed later on in an item of the operation at an association abnormal time.

<Operation at Association Abnormal Time>

Figure 12:
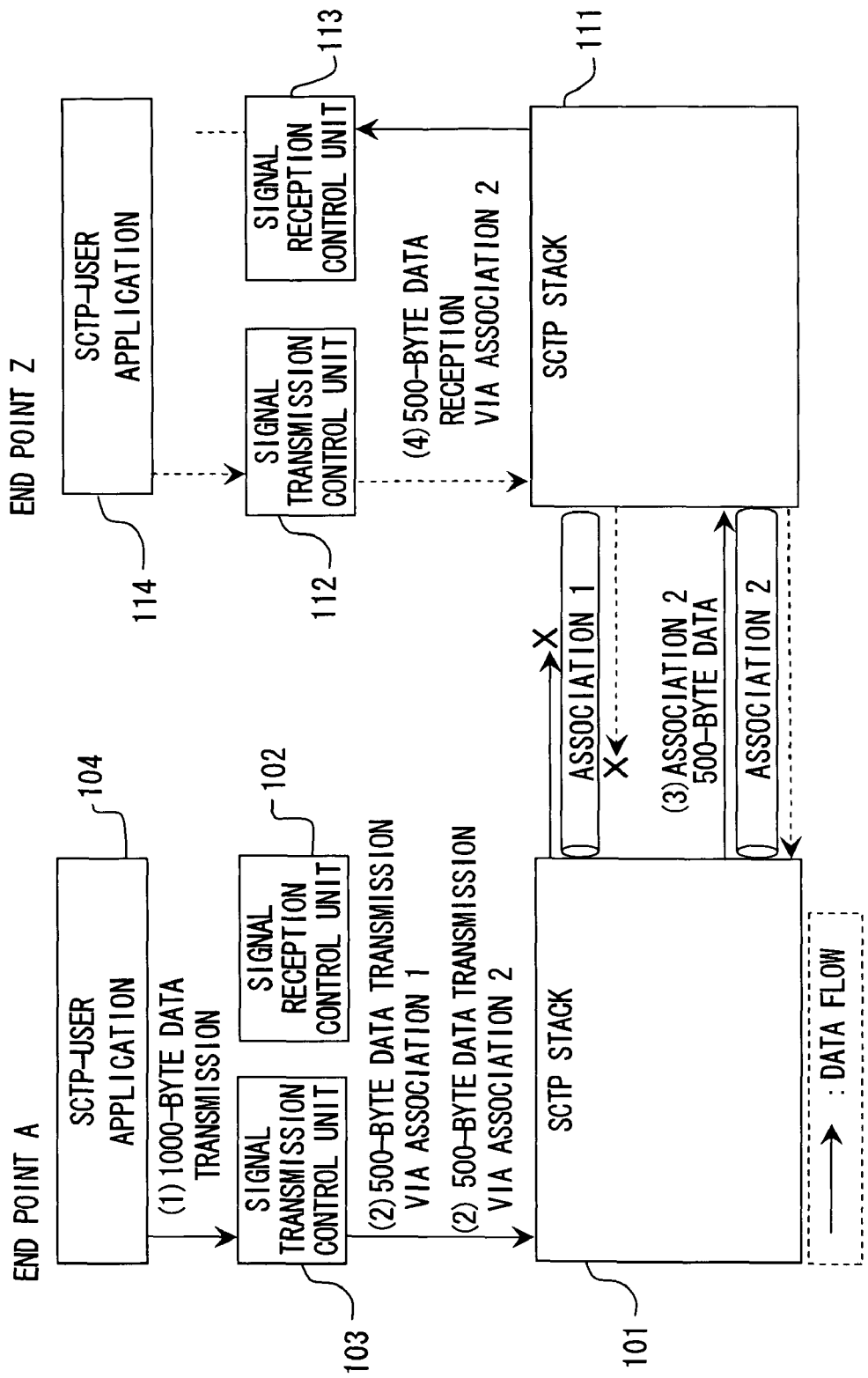
FIG. 12 is a diagram showing an image of the data transmission between the communication devices in the embodiment (when abnormality occurs)

Next, an example of the operation of the communication device in such a case that the association abnormality occurs due to some sort of factor, will be explained with reference to FIGS. 12 and 13. FIG. 12 is a diagram showing an image of the data transmission between the communication devices in the case where the association abnormality occurs. FIG. 13 shows an example of the settings in the association information table at the association abnormal time.

The endpoint A on the transmitting side transmits the 500-byte data assigned the transmission number "1" via the association 1 and another 500-byte data assigned the transmission number "2" via the association 2, respectively. FIG. 12 shows a case in which the abnormality occurs in the association 1 in that instance, and the endpoint Z is unable to receive the data. Namely, the signal reception control unit 113 of the endpoint Z receives the data assigned the transmission number "2" via the association 2 but does not receive the data via the association 1. The signal reception control unit 113, when all the associations are recognized to be normal, expects the data to be always received via all the associations. Therefore, when coming to a state where the data are received via only the association 2, the signal reception control unit 113 judges, as the data can not be normally restored, that some sort of abnormality occurs in the association 1.

The operation that the signal reception control unit 113 judges the association to be abnormal, is conducted by use of the receiving timer and an abnormality detection threshold value. The signal reception control unit 113, when receiving the data via any one of the associations, starts up the receiving timer. Thereafter, the signal reception control unit 113 judges all the associations to be normal in the case of receiving the data via all other associations till the receiving timer comes to the abnormality detection threshold value. While on the other hand, if there is the association via which the data can not be received till the receiving timer comes to the abnormality detection threshold value, the signal reception control unit 113 judges this association to be abnormal. The signal reception control unit 113 updates the association state in the association information table with the result of this judgment. FIG. 13 shows the association information table updated by the signal reception control unit 113 in that case. As shown in FIG. 13, in that case, the state of the association 1 becomes "abnormal".

On the other hand, the endpoint A transmitting the segmented data, as the S-ACK chunk is not sent from the endpoint Z via the association 1, detects the communication abnormality in the association 1. The endpoint A detects this communication abnormality by use of the retransmission timer, a retransmission count, etc. in the form adapted to the SCTP specifications described above. The signal transmission control unit 103 notified of the association abnormality updates, based on this information, the association state in the self-retained association information table.

Note that if the data transmission request is given from the SCTP-USER application 114 of the self-endpoint (the endpoint Z) before the signal reception control unit 113 updates the association information table (before the receiving timer comes to the abnormality detection threshold value), the signal transmission control unit 112 executes the transmission process irrespective of the state of the signal reception control unit 113. This intends to enable the communication partner side (the endpoint A) to recognize the association abnormality by transmitting the data even in a state where there is concern about the occurrence of the abnormality in the association 1.

The endpoints A and Z detecting the abnormality in the association 1 do not hereafter employ the association 1 for the data transmission. Namely, if the abnormality occurs in even one of the associations, the signal transmission control unit 103, without segmenting hereafter the data, transmits the data by using the normal associations in the same way as conventionally done by SCTP. Thereafter, the signal transmission control unit 103 of the endpoint A and the signal reception control unit 113 of the endpoint Z notify the SCTP-USER applications (104 and 114) of such abnormality information.

The SCTP-USER application receiving this notification notifies the SCTP stack of an instruction to delete the association 1 where the abnormality occurred, thereby deleting the association 1. Further, the information about the association 1 is similarly deleted from the association information table. Hereafter, the SCTP-USER application may also notify of a new association establishing request.

<<Operation Flow at Application Abnormal Time>>

Figure 14:
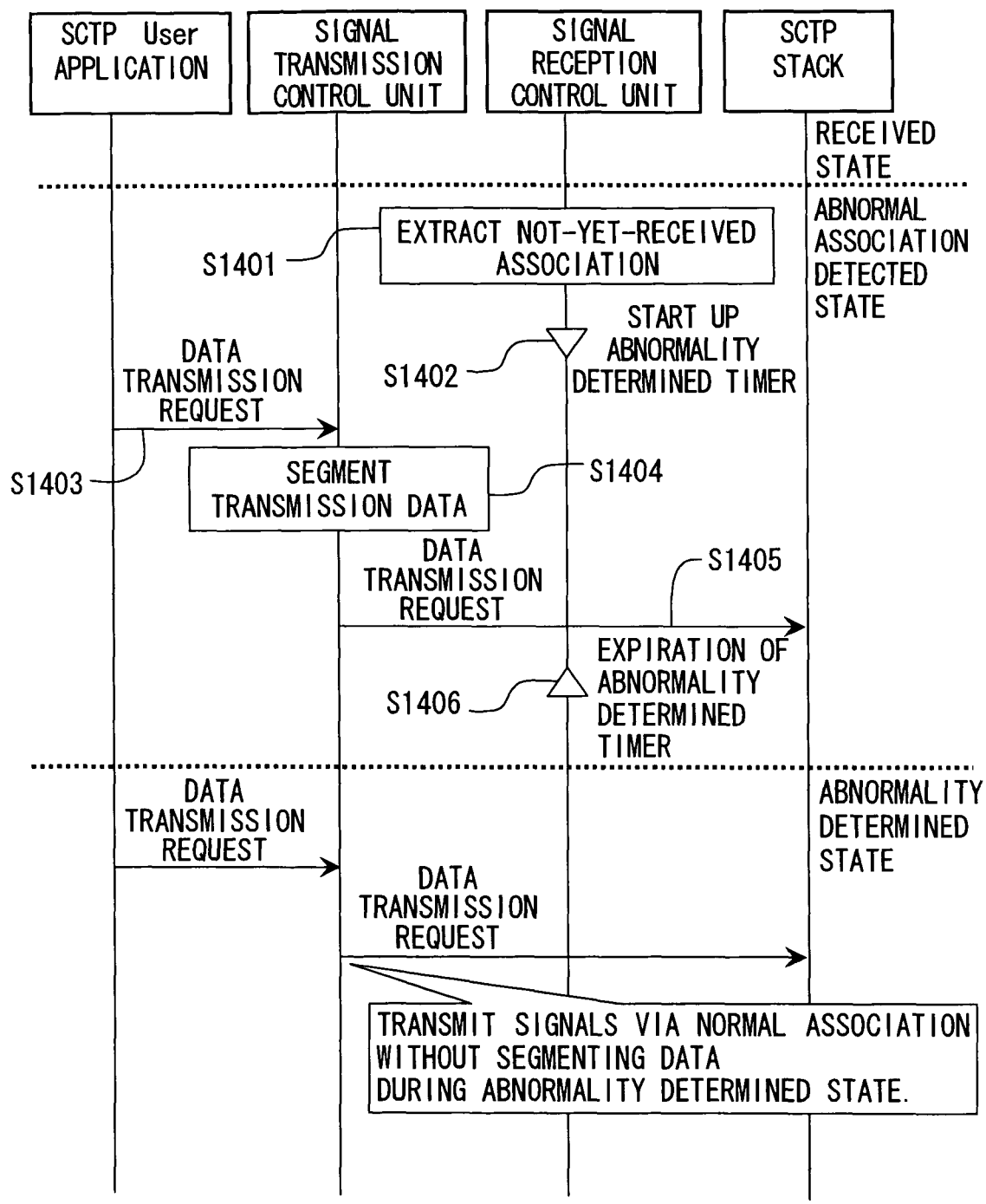
FIG. 14 is a diagram showing an operation sequence of the communication device in the embodiment at an association abnormal time.
Figure 16:
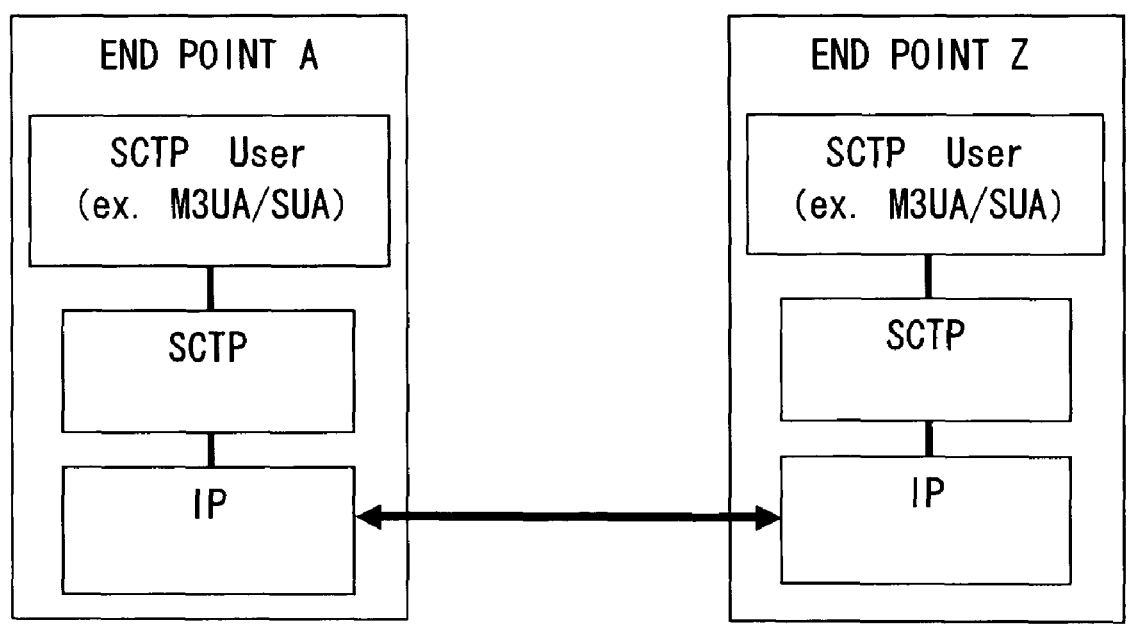
FIG. 16 is a diagram showing an SCTP protocol stack.
Figure 17:
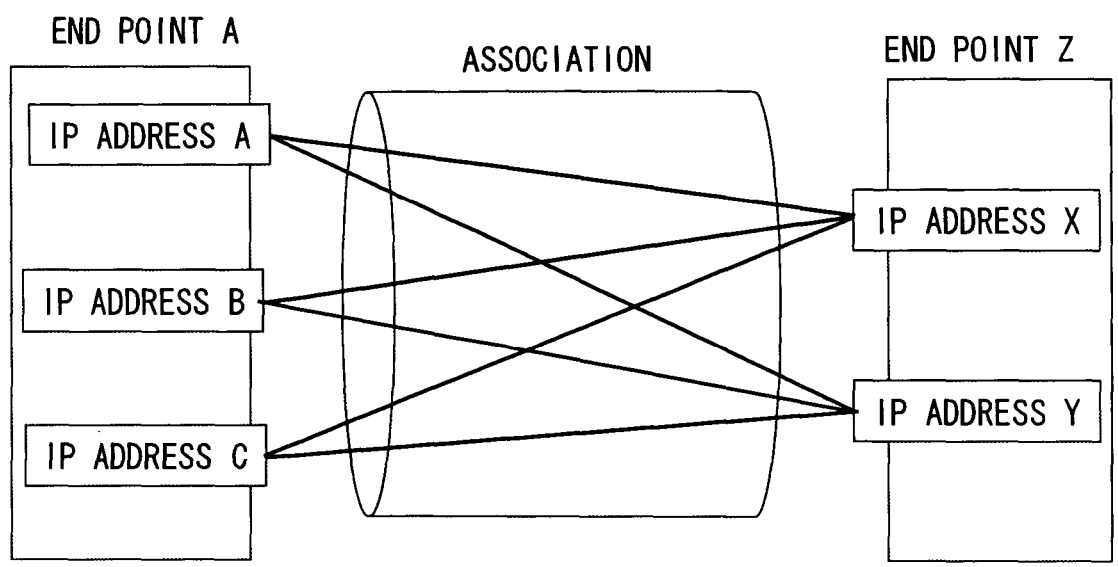
FIG. 17 is a diagram showing SCTP associations and multi-homing.
Figure 18:
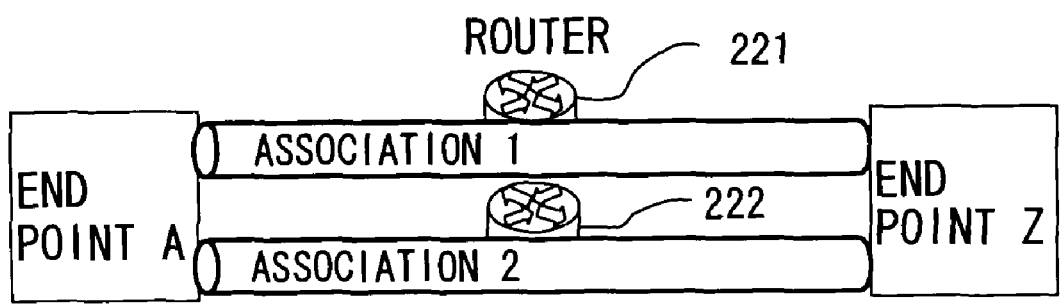
FIG. 18 is a diagram showing how the SCTP association that does not use the multi-homing is established.
Figure 19:
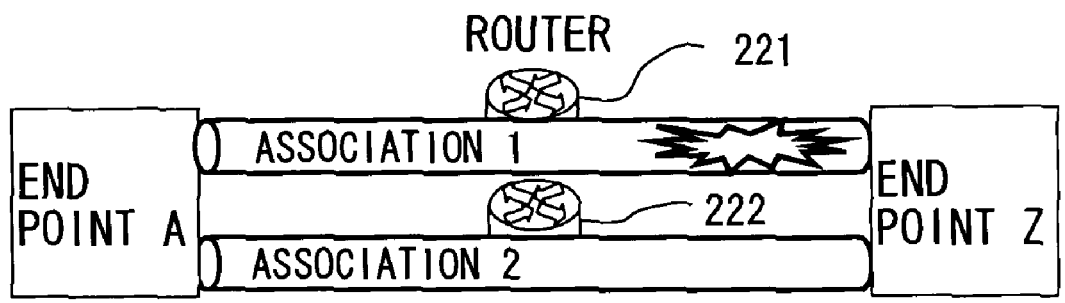
FIG. 19 is a diagram showing how the abnormality occurs in an SCTP association 1 that does not employ the multi-homing.
Figure 20:
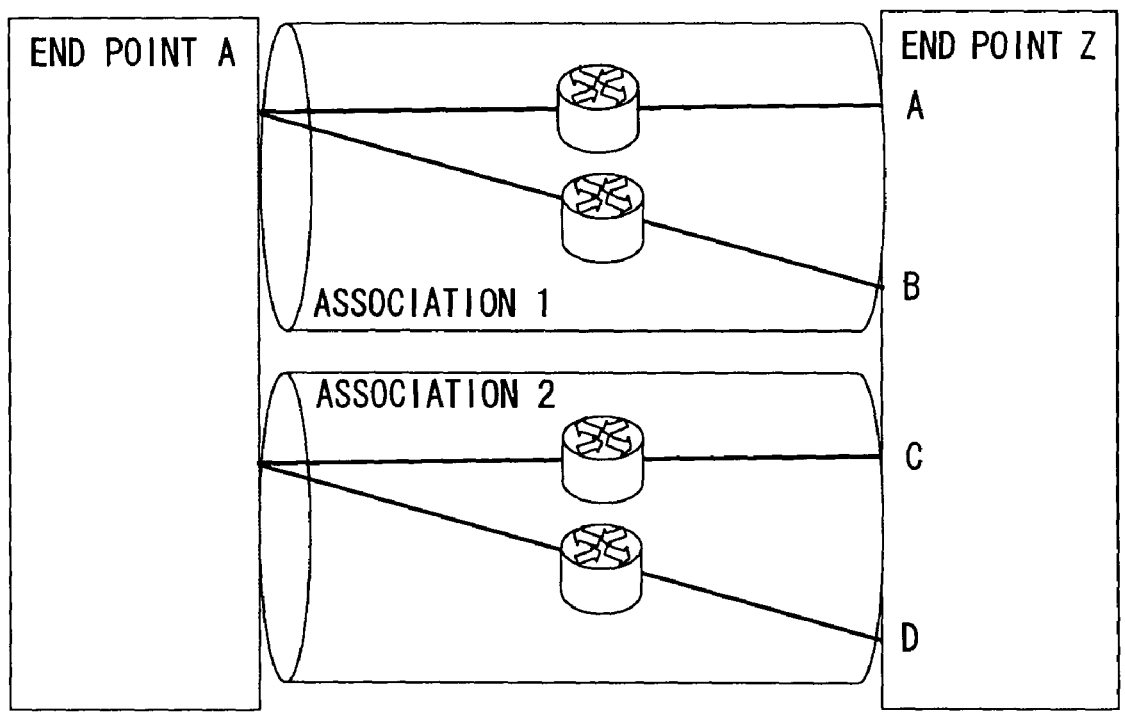
FIG. 20 is a diagram showing how the SCTP association employing the multi-homing is established.
Figure 21:
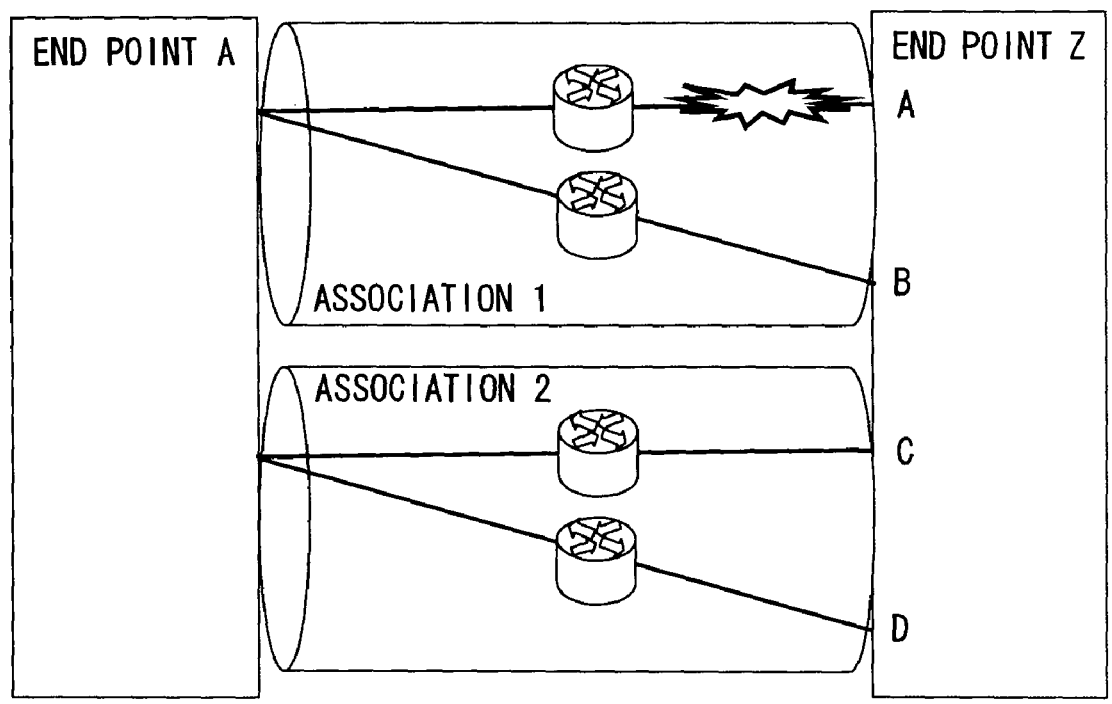
FIG. 21 is a diagram showing how the abnormality occurs in a path A in the SCTP association 1 using the multi-homing.
Figure 22:
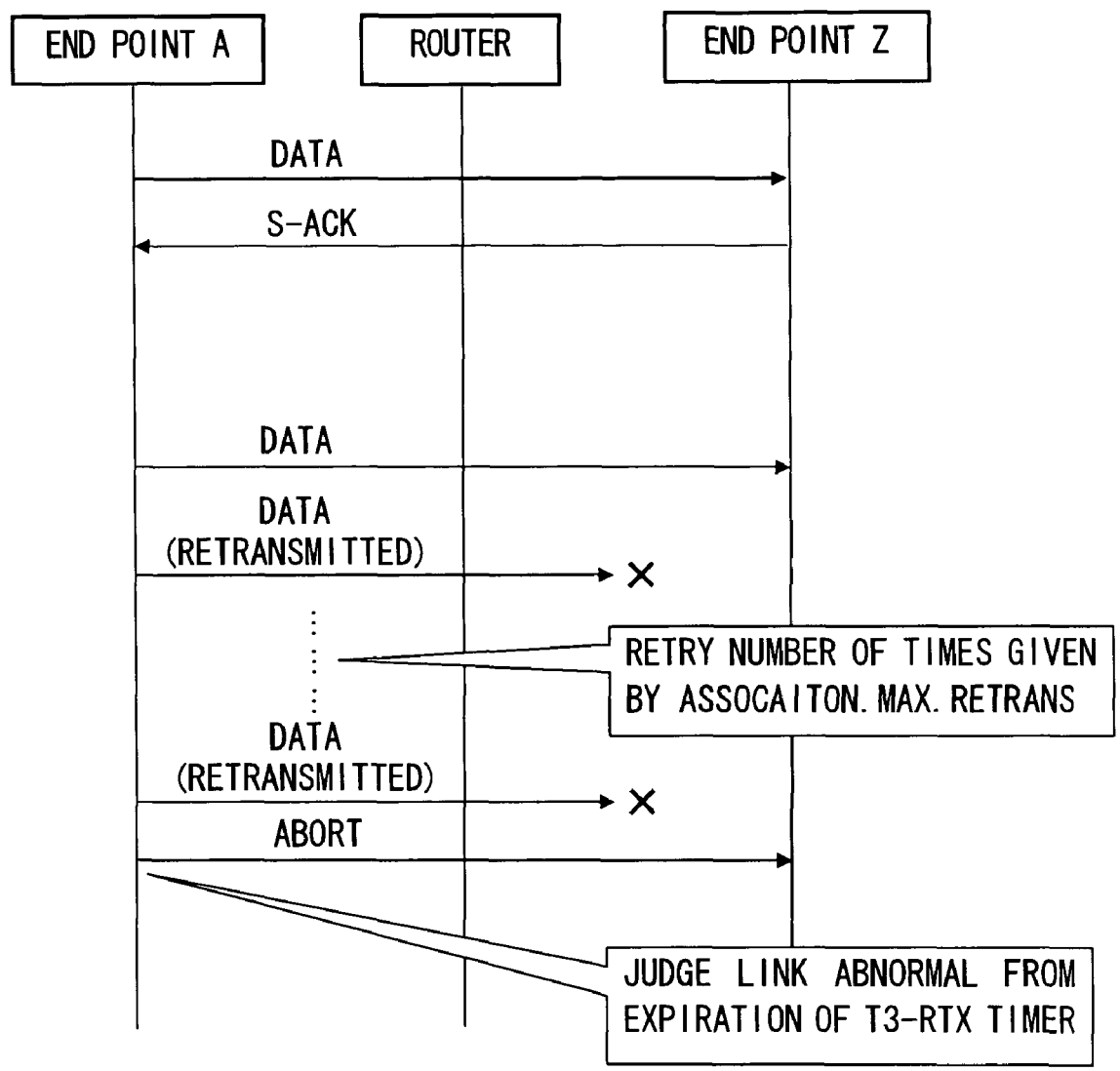
FIG. 22 is a diagram showing an operation sequence of each endpoint when the communication abnormality occurs.

An operation flow of the communication device at an association abnormal time will be explained with reference to FIG. 14. FIG. 14 shows an operation sequence of the communication device in the embodiment at the association abnormal time.

As earlier stated in the operation at the normal time, the communication device, when the association abnormality is detected, comes to the [abnormal association detected state]. When transiting to the [abnormal association detected state], the signal reception control unit detects the association via which the data are not received (S1401). From this, the signal reception control unit determines the association where the association abnormality occurred.

Simultaneously, the signal reception control unit starts up an abnormality determined timer (S1402). The signal reception control unit, in the case of receiving the data transmission request from the SCTP-USER application (S1403) during a period till this abnormality determined timer expires (S1406), segments the transmission data as normally done (S1404), and transmits the data by use of all the associations (S1405). Thus, it follows that the partner communication device is also notified of the abnormality-occurred association by transmitting the data to the partner communication device via also the association where the abnormality is considered to occur.

When the abnormality determined timer expires (S1406), the communication device comes to an [abnormality determined state], and judges that the association via which the data are not received is abnormal. Thereafter, when the association with the abnormality occurred is reestablished by the instruction etc. given from the SCTP-USER application, the communication device transits to the [not-yet-received state] from the [abnormality determined state].

[Recommended Value of Abnormality Detection Threshold Value and Determination Method Thereof]

As described above, in the case where the communication device on the transmitting side detects the association abnormality, a timer pursuant to the SCTP specifications defined in RFC is employed. FIG. 15 is a diagram showing the recommended values of the RFC-defined SCTP timer. Among the RFC-defined timers, a T3-rtx timer is specified as the timer for assuring the data transmission as in the embodiment. Then, according to the specifications, 3 sec. is specified as the recommended value of an initial value of this timer.

In the communication devices in the embodiment, the segmented data are sent via all the established associations, and, if the receiving-side communication device is unable to receive the data via any one of the associations, this is judged to be the association abnormality. Then, this unreceivable judgment involves using the receiving timer based on the present invention, and, if the receiving timer exceeds the abnormality detection threshold value, it is judged that the data can not be received.

Accordingly, the communication device in the embodiment can detect the association abnormality at a high speed by setting the abnormality detection threshold value to a value smaller than the T3-rtx timer. With this setting, in the embodiment, the initial value of the abnormality detection threshold value is set equal to or smaller than a half of the timer value in a retry count "10" (10 times) of the T3-rtx timer shown in FIG. 15. Note that this abnormality detection threshold value may also be recalculated and changed based on an RTT (Round Trip Time) measurement.

[Operation/Effects of Embodiment]

In the communication device according to the embodiment, when the transmitting-side communication device transmits the data, the data are segmented by the number of the associations established between the communication device itself and the transmission destination communication device, and the segmented data are transmitted via the respective associations, simultaneously. On the other hand, the receiving-side communication device, if the associations established between the receiving-side communication device and the communication device as the transmission source include even one association with no data received, judges this to be the association abnormality.

Thus, in the embodiment, if the receiving-side communication device does not receive the data via all the associations when the receiving timer value is within the abnormality detection threshold value, this is detected as the association abnormality. Further, this abnormality detection threshold value is the time value used for judging whether or not the data can be received via the association and can be therefore set shorter than by the SCTP retransmission process.

With this contrivance, without waiting for the completion of the SCTP retransmission process by the transmitting-side communication device, the receiving-side communication device can promptly detect the association abnormality.

Moreover, in the communication devices according to the embodiment, each communication device retains the common association information table and holds the communication state with respect to every association. Then, the communication device refers to this association information table and, if even one abnormal association exists, transmits the data via one normal association without segmenting the transmission data hereafter. In this case, "abnormal" is entered as the association state also in the association information table of the receiving-side communication device, and hence it is judged that the unsegmented data are transmitted thereto.

With this contrivance, in the embodiment, if the association abnormality occurs and even when the data transmission request is given during the reestablishment of the association, the data can be normally transmitted.

Furthermore, in the transmitting-side communication device according to the embodiment, the transmission number is assigned to every segmented data, and the segmented data are transmitted together with the transmission number. In the receiving-side communication device, the received data are reassembled in sequence according to the transmission number thereof and can be thereby restored into the original data.

Moreover, in the receiving-side communication device according to the embodiment, the [abnormal association detected state] is assessed as the period till the abnormality-occurred association is specified since the association abnormality was detected, and that communication device, if there is the data transmission request during this period, segments and thus transmits the data without referring to the association information table. As a result, the communication device serving originally as the transmitting-side device is also unable to receive the data via the abnormality-occurred association and can therefore make the same judgment about the association abnormality as the receiving-side communication device judges.

With this operation, in the embodiment, it is possible to promptly notify the originally-transmission-sided communication device of the association abnormality.

Further, the communication device according to the embodiment actualizes the aforementioned functions by newly providing the signal transmission control unit and the signal reception control unit by adding none of special functions to the SCTP stack.

This configuration enables the aforementioned functions to be actualized without any loss of the existing SCTP advantages.

<Others>

The disclosures of Japanese patent application No. JP2005-094929, filed on Mar. 29, 2005 including the specification, drawings and abstract are incorporated herein by reference.

What is claimed is:

1. A communication device comprising:
a link configuring unit to configure a plurality of logical links between the communication device and an opposite communication device;
a receiving unit to receive data associated with each of the plurality of logical links; and
an abnormality detection unit to judge, with respect to each of the plurality of logical links, whether at least one of the plurality of logical links is abnormal by judging if at least one of a plurality of data concurrently-transmitted on the plurality of logical links from the opposite communication device is not received by the receiving unit via the at least one of the plurality of logical links within a predetermined time period following receipt of any other one of the plurality of data on any other one of the plurality of logical links;
a segmenting unit to segment transmission data, the segmented transmission data being associated with at least one of the plurality of logical links;
a transmission unit to transmit the segmented transmission data via the at least one of the plurality of logical links associated with the segmented transmission data; and
a storage unit to store information about the logical link judged to be the abnormal logical link by the abnormality detection unit,
wherein, if the storage unit contains information about the abnormal logical link when requested to transmit the transmission data, the segmenting unit stops segmenting the transmission data, and the transmission unit transmits the un-segmented transmission data via any of the plurality of logical links other than the abnormal logical link.

2. The communication device according to claim 1, wherein
the segmenting unit assigns a transmission number to the segmented transmission data, and
the transmission unit transmits the segmented transmission data together with the transmission number assigned to this segmented transmission data.

3. The communication device according to claim 1, further comprising:
a synthesizing unit to synthesize the data received by the receiving unit via each of the plurality of logical links, corresponding to transmission numbers received together with the data.

4. A logical link abnormality detection method executed by a communication device transferring and receiving data to and from an opposite communication device via a plurality of logical links, comprising:
receiving data via the plurality of logical links; and
judging, with respect to each of the plurality of logical links, at least one of the plurality of logical links is abnormal by judging if at least one of a plurality of data concurrently-transmitted on the plurality of logical links from the opposite communication device is not received by the communication device itself via the at least one of the plurality of logical links within a predetermined time period following receipt of any other one of the plurality of data on any other one of the plurality of logical links;

segmenting transmission data by a segmenting unit, the segmented transmission data being associated with at least one of the plurality of logical links;

transmitting the segmented transmission data by a transmitting unit via the at least one of the plurality of logical links associated with the segmented transmission data; and storing information about the logical link judged to be the abnormal logical link by the abnormality detection unit in a storage unit, wherein, if the storage unit contains information about the abnormal logical link when requested to transmit the transmission data, the segmenting unit stops segmenting the transmission data, and the transmitting unit transmits the un-segmented transmission data via any of the plurality of logical links other than the abnormal logical link.

5. An SCTP communication device transferring and receiving data to and from an opposite communication device by use of SCTP (Stream Control Transmission Protocol), comprising:

a link configuring unit to configure a plurality of logical links between said SCTP communication device and the opposite communication device;

a receiving unit to receive data via the plurality of logical links; and an abnormality detection unit to judge, with respect to each of the plurality of logical links, at least one of the plurality of logical links is abnormal by judging if at least one of a plurality of data concurrently-transmitted on the plurality of logical links from the opposite communication device is not received by the receiving unit via the at least one of the plurality of logical links within a predetermined time period following receipt of any other one of the plurality of data on any other one of the plurality of logical links a segmenting unit to segment transmission data, the segmented transmission data being associated with at least one of the plurality of logical links;

a transmission unit to transmit the segmented transmission data via the at least one of the plurality of logical links associated with the segmented transmission data; and a storage unit to store information about the logical link judged to be the abnormal logical link by the abnormality detection unit, wherein, if the storage unit contains information about the abnormal logical link when requested to transmit the transmission data, the segmenting unit stops segmenting the transmission data, and the transmission unit transmits the un-segmented transmission data via any of the plurality of logical links other than the abnormal logical link.

* * * * *